US011488069B2

(12) United States Patent
Kuo et al.

(10) Patent No.: US 11,488,069 B2
(45) Date of Patent: Nov. 1, 2022

(54) METHOD FOR PREDICTING AIR QUALITY WITH AID OF MACHINE LEARNING MODELS

(71) Applicant: National Chung-Shan Institute of Science and Technology, Taoyuan (TW)

(72) Inventors: Li-Yen Kuo, Tainan (TW); Chih-Lun Liao, Taichung (TW); Chun-Han Tai, Pingtung County (TW); Hao-Yu Kao, New Taipei (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 866 days.

(21) Appl. No.: 16/179,993

(22) Filed: Nov. 4, 2018

(65) Prior Publication Data
US 2019/0325334 A1      Oct. 24, 2019

(30) Foreign Application Priority Data
Apr. 23, 2018   (TW) .................. 107113712

(51) Int. Cl.
*G06N 20/20*   (2019.01)
*G06N 7/00*    (2006.01)
(Continued)

(52) U.S. Cl.
CPC .............. *G06N 20/20* (2019.01); *G06N 3/04* (2013.01); *G06N 3/08* (2013.01); *G06N 7/00* (2013.01); *G06N 20/00* (2019.01); *G08B 21/12* (2013.01)

(58) Field of Classification Search
CPC   G06N 7/00; G06N 3/04; G06N 20/00; G06N 99/005; G06N 3/08; G06N 20/20; G08B 21/12
See application file for complete search history.

(56) References Cited

FOREIGN PATENT DOCUMENTS

CN     108009674 A  *  5/2018
CN     106599520 B  *  8/2018

OTHER PUBLICATIONS

Pan, Bingyue, "Application of XGBoost algorithm in hourly PM2.5 concentration prediction" Feb. 2018, pp. 1-7. (Year: 2018).*

(Continued)

*Primary Examiner* — Kevin W Figueroa
*Assistant Examiner* — Chase P. Hinckley
(74) *Attorney, Agent, or Firm* — Winston Hsu

(57) ABSTRACT

A method for predicting air quality with the aid of machine learning models includes: (A) providing air pollution data to perform an eXtreme Gradient Boosting (XGBoost) regression algorithm for obtaining a XGBoost prediction value; (B) providing the air pollution data to perform a Long Short-Term Memory (LSTM) algorithm for obtaining an LSTM prediction value; (C) combining the air pollution data, the XGBoost prediction value and the LSTM prediction value to generate air pollution combination data; (D) performing an XGBoost classification algorithm to obtain a suggestion for whether to issue an air pollution alert; and (E) performing the XGBoost regression algorithm on the air pollution combination data to obtain an air pollution prediction value. Two layers of machine learning models are built, and a situation where prediction results are too conservative when a single model does not have enough data can be improved.

5 Claims, 5 Drawing Sheets

(51) Int. Cl.
G08B 21/12 (2006.01)
G06N 3/04 (2006.01)
G06N 20/00 (2019.01)
G06N 3/08 (2006.01)

(56) References Cited

OTHER PUBLICATIONS

Le et al., "Real-time Air Pollution prediction model based on Spatiotemporal Big data" Apr. 5, 2018, arXiv: 1805.00432v1, pp. 1-7. (Year: 2018).*

Deters et al., "Modeling PM2.5 Urban Pollution Using Machine Learning and Selected Meteorological Parameters" Jun. 18, 2017, pp. 1-14. (Year: 2017).*

Teinemaa et al., "Temporal Stability in Predictive Process Monitoring" Dec. 12, 2017, arXiv: 1712.04165v1, pp. 1-20. (Year: 2017).*

Chen et Guestrin, "XGBoost: A Scalable Tree Boosting System" Jun. 10, 2016, pp. 1-13. (Year: 2016).*

Taylor et al., "Particulate Matter Estimation from Photochemistry: A Modelling Approach using Neural Networks and Synoptic Clustering" Aug. 31, 2016, pp. 2078-2084. (Year: 2016).*

Xu et al., "A Co-Training Approach to the Classification of Local Climate Zones with Multi-Source Data" Jul. 23, 2017, pp. 1209-1212. (Year: 2017).*

Bui et al., "A Deep Learning Approach for Air Pollution Forecasting in South Korea Using Encoder-Decoder Networks and LSTM" Apr. 21, 2018, arXiv: 1804.07891v1, pp. 1-7. (Year: 2018).*

Zheng et al., "Short-Term Load Forecasting Using EMD-LSTM Neural Networks with a XGboost Algorithm for Feature Importance Selection" Aug. 8, 2017, pp. 1-20. (Year: 2017).*

Mitchell et al., "XGBoost: Scalable GPU Accelerated Learning" Jun. 29, 2018, pp. 1-5. (Year: 2018).*

Qi et al., "Deep Air Learning: Interpolation, Prediction, and Feature Analysis of Fine-grained Air Quality" Apr. 11, 2018, pp. 1-13. (Year: 2018).*

Yonekura et al., "Short-term local weather forecast using dense weather station by deep neural network" 2018, pp. 1683-1690. (Year: 2018).*

Jiang et al., "DimBoost: Boosting Gradient Boosting Decision Tree to Higher Dimensions" Jun. 2018, pp. 1363-1376. (Year: 2018).*

Liu et al., "Third-Eye: A Mobilephone-Enabled Crowdsensing System for Air Quality Monitoring" Mar. 2018, pp. 1-26. (Year: 2018).*

Cheng et al., "A Neural Attention Model for Urban Air Quality Inference: Learning the Weights of Monitoring Stations" Feb. 2, 2018. (Year: 2018).*

* cited by examiner

| Situn 🔊 | 1hr | | | 6hr | | | 12hr | | |
|---|---|---|---|---|---|---|---|---|---|
| | Precision | Recall | F1 score | Precision | Recall | F1 score | Precision | Recall | F1 score |
| | 83.87% | 76.47% | 80% | 74.14% | 59.72% | 66.15% | 70.37% | 53.77% | 60.96% |
| RMSE | 4.6549 | | | 7.8232 | | | 10.4644 | | |
| Douliou 🔊 | 1hr | | | 6hr | | | 12hr | | |
| | Precision | Recall | F1 score | Precision | Recall | F1 score | Precision | Recall | F1 score |
| | 84.95% | 71.82% | 77.83% | 79.55% | 74.47% | 76.92% | 71.33% | 88.19% | 78.87% |
| RMSE | 6.4594 | | | 9.3571 | | | 11.0041 | | |
| Chiayi 🔊 | 1hr | | | 6hr | | | 12hr | | |
| | Precision | Recall | F1 score | Precision | Recall | F1 score | Precision | Recall | F1 score |
| | 85.92% | 80.26% | 82.99% | 76.68% | 78.54% | 77.60% | 74.01% | 90.88% | 81.58% |
| RMSE | 7.1683 | | | 9.9885 | | | 10.2738 | | |
| Zuoying 🔊 | 1hr | | | 6hr | | | 12hr | | |
| | Precision | Recall | F1 score | Precision | Recall | F1 score | Precision | Recall | F1 score |
| | 83.94% | 78.26% | 81% | 82.14% | 75.20% | 78.52% | 77.19% | 81.82% | 79.44% |
| RMSE | 6.6582 | | | 10.9878 | | | 12.5988 | | |
| Siaogang 🔊 | 1hr | | | 6hr | | | 12hr | | |
| | Precision | Recall | F1 score | Precision | Recall | F1 score | Precision | Recall | F1 score |
| | 87.88% | 71.02% | 78.56% | 84.92% | 73.08% | 78.55% | 81.54% | 83.21% | 82.36% |
| RMSE | 7.7084 | | | 11.4408 | | | 12.6204 | | |

FIG. 5

METHOD FOR PREDICTING AIR QUALITY WITH AID OF MACHINE LEARNING MODELS

BACKGROUND OF THE INVENTION

1. Field of the Invention

The present invention is related to a method for predicting air quality, and more particularly, to a method for predicting air quality with the aid of machine learning models.

2. Description of the Prior Art

The World Health Organization (WHO) lists air pollution as a major environmental carcinogen, which carries an even higher risk of lung cancer than second-hand smoke. The most dangerous air pollutant is particulate matter 2.5 (PM2.5), which may accumulate deeply inside human lungs. The American Heart Association has verified that PM2.5 is small enough to penetrate the human respiratory system and may carry heavy metals, dioxins and bacteria directly to the thoracic cavity. Therefore, long-term exposure to PM2.5 may increase the risks of myocardial infarction, stroke, arrhythmia, etc., and increases the occurrence and mortality of cardiovascular disease.

In addition, polluted air contains various chemical substances, although the long term influences are not yet known. As pollution sources increase due to development of industry, especially in winter when air flow becomes poor, air pollution exceeding a standard value occurs often, with white smoke even obscuring buildings. It is obvious how severe the issue of air pollution has become.

As there are many air pollution sources, it is hard to monitor air pollution accurately. A current method for monitoring air pollution is based on an atmospheric model to perform calculations, whereby air pollution conditions over a next few days can be predicted. Related problems exist, however. For example: (1) resolution of predicted time intervals is low, where a conventional method performs estimation of an average value in the unit of days rather than predicting in real-time, although real-time prediction may be closer to living habits of residents; (2) resolution of predicted spatial range is low, where the atmospheric model usually varies across multiple longitudes and latitudes, and the air pollution is only predicted according to an average over a wide range. As air quality is strongly related to human activities and habits, as well as topographic factors, it is hard for the conventional method, which considers atmospheric flow only, to perform prediction of the air quality for a small region. A prediction result without localization merely acts as a reference for local residents, and there has no practical benefit for early-warning in terms of real-time reaction. Further, in addition to polluting gases in the monitored region, pollution factors carried from outside the region, for example by monsoons, should be monitored as well, where influence of these pollution sources may varies according to different wind speeds, wind directions and dates. Additionally, even though adjacent regions may have similar weather conditions, these regions may have different levels of influence due to topographic factors. The number of variables of air pollution is huge, making it hard to predict the resultant air pollution accurately.

A method for predicting air pollution in related arts is to train a regressor by eXtreme Gradient Boosting (XGBoost) regression algorithm with adjustable parameters according to air pollution data, and then predict future air pollution via a well-trained XGBoost regression algorithm. Atmospheric environmental change over a previous period of time may influence a concentration of future air pollution because air pollution is time-variant. Relying on the XGBoost regression algorithm only requires sufficient data for training to precisely predict air pollution in order to help the XGBoost regression algorithm learn time-varying characteristics.

Thus, there is a need for the industry to develop a method for predicting air quality with improved accuracy of prediction, via utilizing an artificial intelligence deep learning model such as Long Short-term Memory (LSTM), to improve a situation where prediction results are too conservative when a single model does not have enough data. As a result, both cost and timeliness are considered, and an air pollution condition can be effectively and precisely predicted, in order to issue air pollution alerts for improving human health.

SUMMARY OF THE INVENTION

The main objective of the present invention is to provide a method for predicting air quality with the aid of machine learning models, by combining air pollution data, an XGBoost regression algorithm, a LSTM algorithm, and an XGBoost classification algorithm, in order to obtain reliable and correct prediction results.

In order to achieve the aforementioned objective, the present invention provides a method for predicting air quality with the aid of machine learning models. The method comprises: (A) providing air pollution data for performing an eXtreme Gradient Boosting (XGBoost) regression algorithm in order to obtain a XGBoost prediction value; (B) providing the air pollution data for performing a Long Short-Term Memory (LSTM) algorithm in order to obtain a LSTM prediction value; (C) combining the air pollution data, the XGBoost prediction value and the LSTM prediction value to generate air pollution combination data; (D) performing an XGBoost classification algorithm to obtain a suggestion for whether to issue an air pollution alert; and (E) performing the XGBoost regression algorithm on the air pollution combination data to obtain a prediction value of air pollution.

The air pollution data in step (A) may comprise parameters such as PM2.5 concentration, temperature, humidity, wind speed, wind direction, and dates, wherein the aforementioned parameters are all in the form of vectors, to be characteristic vectors for machine learning. For example, wind direction is typically indicated by a direction angle (i.e. 0°-360°), where 0° and 360° have the same meaning, but the values thereof are quite different; this kind of mathematic model may therefore cause errors in prediction results. Thus, the wind direction parameter that is originally a 1-dimensional characteristic vector is mapped to a 2-dimensional space. In coordinate form, both 0° and 360° are (1, 0), and 45° is (cos 45°, sin 45°); thus the error in values no longer exists. In addition, since Taiwan is located in a monsoon zone, the time of year is also an important factor. Seasonal cycles occur roughly once per year, but as December and January are adjacent, a difference between values of December and January (i.e. twelve and one) is the greatest. In order to solve this problem, 365 days within one year respectively correspond to angles within 360°, so that the date is expressed with a 2-dimensional coordinate (cos θ, sin θ), where θ=(x/365)*360°, and x indicates a date index within one year. A date characteristic is therefore expressed with a coordinate characteristic.

The air pollution combination in step (C) may be generated by combining the air pollution data, the XGBoost prediction value and the LSTM prediction value in the forms of vectors. As the air pollution data, the XGBoost prediction value and the LSTM prediction value are all in the form of vectors, linking these vectors together may obtain characteristic vectors for second time machine learning.

The suggestion for whether to issue the air pollution alert in step (D) may comprise an air pollution alert value, and the air pollution alert value is arranged to monitor an air pollution condition. When the air pollution alert value exceeds a predetermined value, indicating that current air pollution condition may be severe, it should be considered whether to inform the public by issuing an alert, to make people stay indoors rather than do outside activities.

The above summary and the following detailed description and accompanying drawings are for further illustrating features of the present invention and the effects thereby achieved. Further objectives and advantages of the present invention will be provided in the subsequent description and the accompanying drawings.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a prediction result of the air quality of southern regions of Taiwan in January 2017 according to an embodiment of the present invention.

DETAILED DESCRIPTION

Embodiments are provided to describe the method of the present invention. Those skilled in the art may understand the advantages and effects of the present invention according to the detailed description, which is provided as follows.

Figure 1:
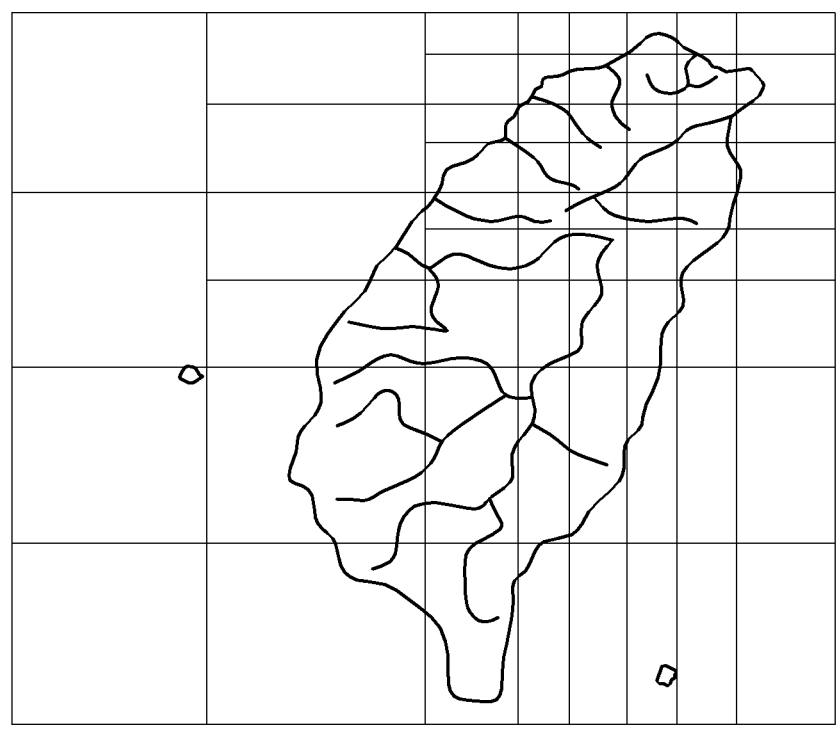
FIG. 1 is a diagram illustrating partition grid of air pollution according to the present invention.

Refer to FIG. 1, which is a diagram illustrating partition grid of air pollution according to the present invention. As shown in FIG. 1, in addition to air pollution sources within Taiwan itself, pollution sources from nearby regions may also influence Taiwan via winds, wherein influence from nearby regions is greater, and influence from other regions may gradually reduce with increasing distance. Thus, in response to influence levels from different regions, sizes of the partition grid are shown in FIG. 1. Since the influence level of the pollution sources of the Taiwan region itself is the greatest, the partition grid of Taiwan are the most detailed. The influence levels of China and coastal regions of Korea are the second greatest, and the influence levels of inland regions of Mongolia and China are less, so the partition grid thereof are the least detailed.

Figure 2:
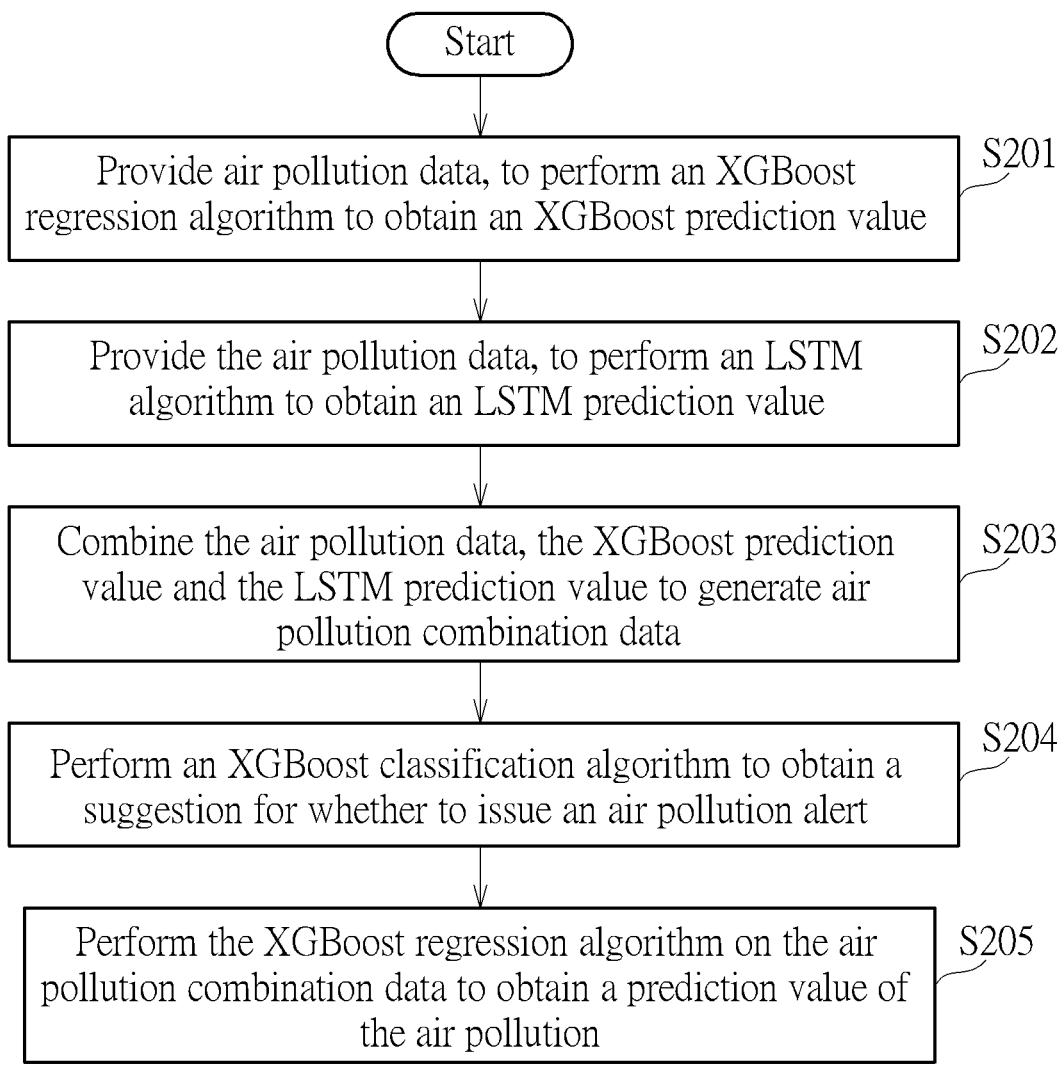
FIG. 2 is a flowchart illustrating a method for predicting air quality with the aid of machine learning models according to the present invention.

Refer to FIG. 2, which is a flowchart illustrating a method for predicting air quality with the aid of machine learning models according to the present invention. As shown in FIG. 2, the method comprises the following steps:

Step S201: Provide air pollution data, to perform an XGBoost regression algorithm to obtain an XGBoost prediction value.

Step S202: Provide the air pollution data, to perform an LSTM algorithm to obtain an LSTM prediction value.

Step S203: Combine the air pollution data, the XGBoost prediction value and the LSTM prediction value to generate air pollution combination data.

Step S204: Perform an XGBoost classification algorithm to obtain a suggestion for whether to issue an air pollution alert.

Step S205: Perform the XGBoost regression algorithm on the air pollution combination data to obtain a prediction value of the air pollution.

The air pollution data comprises multiple sets of parameter data. For example, weather factors (e.g. sunny and rainy) may influence an amount of pollution in the air. Thus, in an embodiment of the present invention, temperature and humidity during each time interval may be listed in characteristic vectors for machine learning. Note that the reason why humidity is utilized rather than rainfall is that rainfall characteristic exists on rainy days only (there is no data without rain), whereas a humidity difference between cloudy days and sunny days may not be distinguished without humidity information. For the same reason, wind speed and wind directions should also be considered. It should be noted that a wind direction characteristic is typically indicated by an angle, where 0° and 360° have the same meaning, but the values thereof are quite different, and this kind of mathematic model may therefore cause errors in prediction results. Thus, the wind direction characteristic that is originally a 1-dimensional characteristic is mapped to a 2-dimensional space. In forms of coordinates, both 0° and 360° are (1, 0), and 45° is (cos 45°, sin 45°); thus, the error no longer exists. In addition, since Taiwan is located in a monsoon zone, the time of year is also an important factor. Seasonal cycles roughly circulate once per year. December and January are adjacent, but a difference between the values of December and January (i.e. twelve and one) is the greatest. In order to solve this problem, 365 days within one year respectively correspond to angles within 360° as shown in equation (1), and coordinate characteristics are utilized to indicate date characteristics.

$$f(x) = \frac{x}{365} \times 360° \tag{1}$$

There are many air pollution sources. In addition to gas emissions in the local region, there are external factors carried from outer places via, for example, monsoons, and the influence levels of these external factors may be different according to different wind speeds, wind directions and dates. Additionally, even though adjacent regions may have similar weather conditions, these regions may have different influence levels due to topographic factors. As the number of variables of air pollution is huge, it is hard to predict air pollution accurately. Thus, machine learning is introduced for prediction of air pollution, in order to improve accuracy. In this embodiment of the present invention, the LSTM algorithm, which has time continuity, is selected. Architecture of the LSTM algorithm has the effects of keeping and continuing states of past tasks, and therefore is capable of being utilized for the prediction of air pollution. In addition, the LSTM algorithm can find obvious time-varying characteristics without being influenced by transient noise, which can help the machine learning to find a better solution. Since change in air pollution is performed continuously and slowly, time intervals in this embodiment are shown as follows: $[t_0\ t_1\ t_2\ t_3\ t_4\ t_5\ \ldots\ t_n.]$ where n is a positive integer. The duration of each time interval may be different, such as 1 hour, 8 hours, 24 hours, etc. According to an air pollution index of a previous time interval (known air pollution data), the method (or the LSTM algorithm) may predict an air pollution index of a next time interval (predicted air pollution data).

TABLE 1

| $t_1$ | $t_2$ | $t_3$ | $t_4$ | $t_5$ | ... | $t_n$ |
|---|---|---|---|---|---|---|
| K1 | P1 | | | | | |
| | K2 | P2 | | | | |
| | | K3 | P3 | | | |
| | | | K4 | P4 | | |

Table 1 is a time parameter input table in an LSTM form. The first row of Table 1 illustrates the time intervals $[t_0\ t_1\ t_2\ t_3\ t_4\ t_5\ \ldots\ t_n]$, K1, K2, K3 and K4 are sets of known air pollution data of, respectively, and P1, P2, P3 and P4 are sets of predicted air pollution data of respective time intervals.

Figure 3:
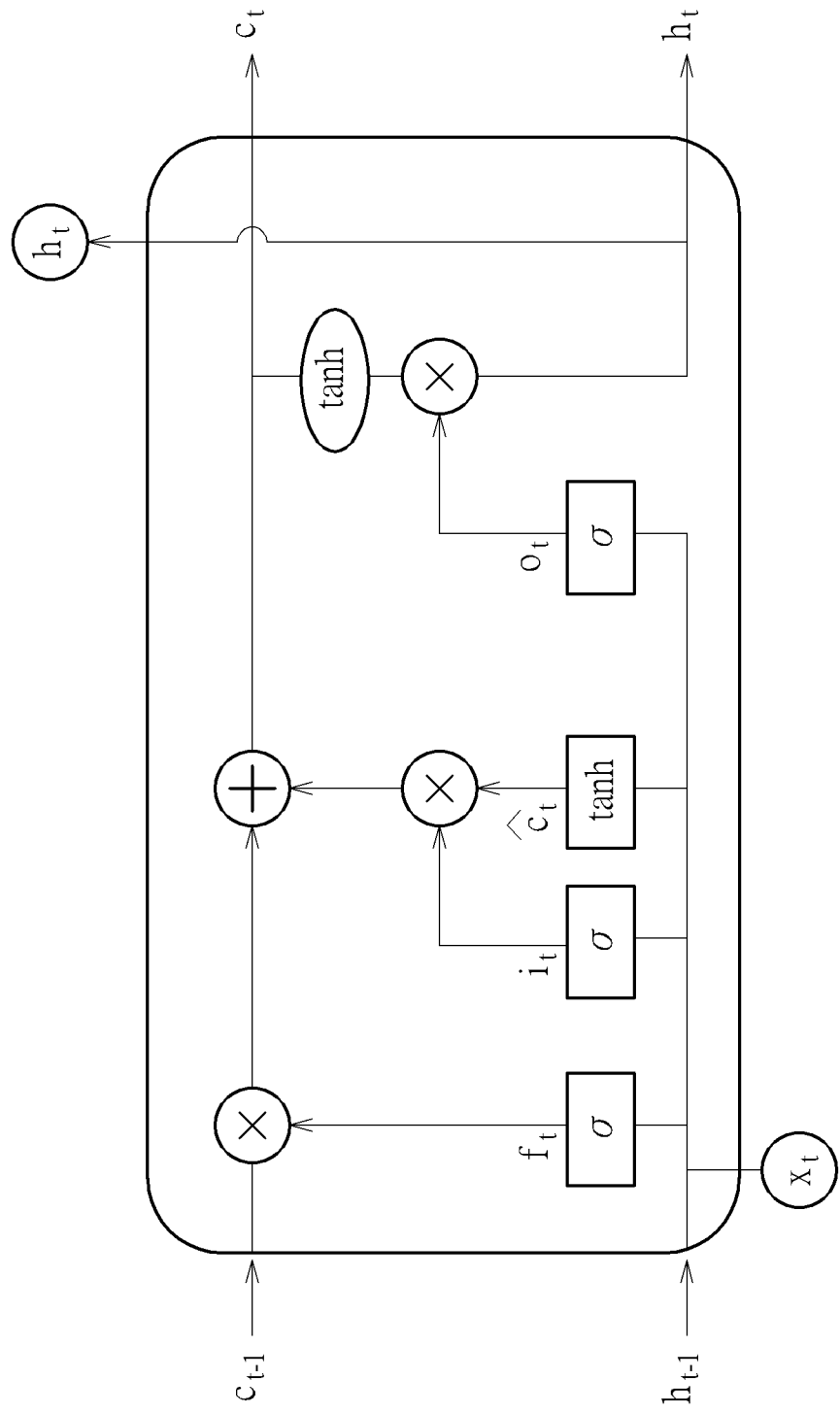
FIG. 3 is a diagram illustrating architecture of an LSTM algorithm according to the present invention.

Refer to FIG. 3, which is a diagram illustrating the architecture of the LSTM algorithm according to the present invention. As shown in FIG. 3, internal calculations of the LSTM algorithm are shown as follows:

$$f_t = \sigma(U_f \cdot x_t + W_f \cdot h_{t-1} + b_f)$$

$$i_t = \sigma(U_i \cdot x_t + W_i \cdot h_{t-1} + b_i)$$

$$\hat{C}_t = \tan h(U_c \cdot x_t + W_c \cdot h_{t-1} + b_c)$$

$$c_t = f_t * c_{t-1} + \hat{C}_t$$

$$o_t = \sigma(U_o \cdot x_t + W_o \cdot h_{t-1} + b_o)$$

$$h_t = o_t \cdot \tan h(c_t)$$

where $x_t$ is an input at a time t, $h_t$ is a state generated at the time t, $c_t$ is a memory generated at the time t, and $f_t$, $i_t$, $\hat{C}_t$ and $o_t$ are internal thinking logics of the LSTM algorithm, according to $x_t$ and $h_{t-1}$ (i.e. the input of this moment and the state so far). These four logics correspond to four thinking modes of a human, comprising forgetting ($f_t$), memory ($i_t$), experience ($\hat{C}_t$) and thought ($o_t$). In addition, W (e.g. $W_f$, $W_i$, $W_c$ and $W_o$), U (e.g. $U_f$, $U_i$, $U_c$, and $U_o$) and b (e.g. $b_f$, $b_i$, $b_c$, and $b_o$) are weight matrices and bias vector parameters which need to be learned during training. The parameter $f_t$ may determine whether past experience still needs to be kept, $\hat{C}_t$ is experience of this time, $i_t$ is arranged to determine the experience of this time, and $o_t$ is a reacting thought regarding the input and the state of this time. This thought ($o_t$) may be further combined with the memory ($i_t$) to generate a new state ($h_t$), and finally the state ($h_t$) and the memory ($i_t$) of finishing tasks of this time may be kept for reference at a next time, in order to achieve an effect that is similar to human memory.

Figure 4:
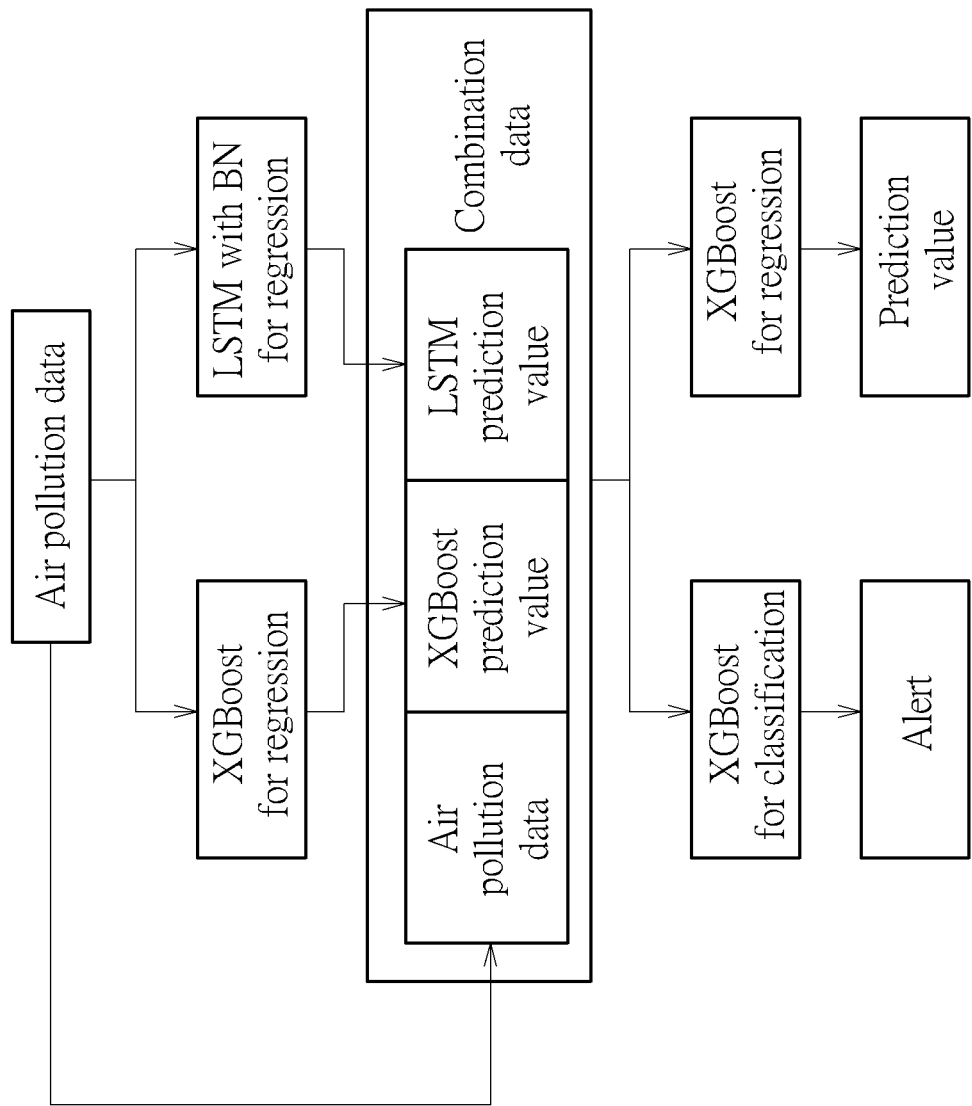
FIG. 4 is a diagram illustrating an overall learning model according to the present invention.

Refer to FIG. 4, which is a diagram illustrating an overall learning model according to the present invention. In order to prevent a situation where the prediction results are too conservative when there is not enough data, for example, a situation where a precision rate is high and/or a recall rate is low, in addition to the LSTM algorithm, an XGBoost method (e.g. the XGBoost regression algorithm) is further applied. The XGBoost method is based on conventional adaptive boosting (AdaBoost), and utilizes multiple simple weak classifiers such as decision Tree and regression and puts them together, to compensate for original weakness. Recent practical experience indicates that the AdaBoost may have excellent manifold learning ability without utilizing a kernel function to perform function mapping on data, and the AdaBoost may operate quickly, and is therefore capable of processing large amounts of data. The XGBoost method is obtained by improving the AdaBoost, and the XGBoost method may learn more effectively in a process of optimization. The overall learning model of the present invention is shown in FIG. 4. The air pollution data is inputted into the XGBoost regression algorithm and LSTM algorithm (e.g. LSTM with batch normalization (BN) for regression) for concurrent learning. After finishing learning, two different models are obtained, wherein output results of these two different models may be further combined with original air pollution data (i.e. the air pollution data), to be an input of a next layer. As a result, the overall learning model with two layers can be obtained; this kind of method may be referred to as model stacking.

In order to verify performance of this embodiment, observation data of sixty observation stations of the Environmental Protection Administration (EPA) all over Taiwan is utilized. The observation data during 2014 to 2016 is taken as training data, and the observation data in January 2017 is taken as predicted data.

TABLE 2

| | Actually dangerous | Actually safe |
|---|---|---|
| Predicted dangerous | a | B |
| Predicted safe | c | D |

The observation data is processed to evaluate the overall learning model (referred to as the model, for brevity) of the present invention as shown in Table 2, which illustrates parameters of the precision rate and the recall rate. To verify the accuracy of the prediction of air pollution, three indexes such as the precision rate, the recall rate and F1 score are provided as follows:

$$\text{precision} = \frac{a}{a+B}$$

$$\text{recall} = \frac{a}{a+c}$$

$$F1\ \text{score} = \frac{2 \times \text{precision} \times \text{recall}}{\text{precision} + \text{recall}}$$

As shown in Table 2, "a" represents conditions that are actually dangerous and are predicted to be dangerous (i.e., true positive), "B" represents conditions that are actually safe but are predicted to be dangerous (i.e., false positive), "c" represents conditions that are actually dangerous but are predicted to be safe (i.e., false negative), and "D" represents conditions that are actually safe and are predicted to be safe (i.e., true negative). A first prediction index of the air pollution, i.e. the precision rate, may indicate conditions that are actually dangerous within all conditions that are predicted to be dangerous; in other words, the precision rate indicates a possibility that a condition of the air pollution is actually dangerous when the model predicts the condition is dangerous. In an ideal situation, predictions every time are correct and no error occurs, and the precision rate is therefore equal to one. A second prediction index of the air pollution, i.e. the recall rate, may indicate sensitivity of the model regarding occurrence of danger. When the recall rate is high, it indicates a high possibility that the model is capable of recognizing danger when the condition is actually dangerous. When the model can correctly predict all dangerous conditions, the recall rate may be one. In order to consider both the precision rate and the recall rate, where both of them are expected to be over a certain level, a third prediction index of the air pollution, i.e. the F1 score, is defined. The F1 score is a combination of the precision rate and the recall rate, where the F1 score may be greatly reduced when one or both of the precision rate and the recall rate falls, and reduction of the F1 score may be greater than an increment of the other of the precision rate and the recall rate. Thus, a better F1 rate may be obtained only if both the precision rate and the recall rate are considered (i.e. both are high).

Refer to FIG. 5, which is a prediction result of the air quality of southern regions of Taiwan (e.g. Situn, Douliou, Chiayi, Zuoying and Siaogang) in January 2017 according to an embodiment of the present invention. As shown in FIG. 5, most precision rates, recall rates and F1 scores for one hour, six hours and twelve hours are greater than 75%, indicating that the accuracy of the prediction in this embodiment is near to 80%, where values of RMSE represent the error of the prediction results, and need to be as small as possible. In an ideal situation where prediction values are exactly the same as actual values, the values of RMSE are zero. In addition, when the suggestion for whether to issue an air pollution alert is "yes" (e.g. PM2.5 concentration is greater than a predetermined value), which is obtained by performing the XGBoost classification algorithm on the air pollution combination data in Step 204, the air pollution alert (indicated by a bell in FIG. 5) may be issued as shown on the left-side of FIG. 5, or be issued in other ways to the public.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for predicting air quality with the aid of machine learning models, comprising:

(A) providing parameters related to air pollution to perform, by a first layer of the machine learning models, an eXtreme Gradient Boosting (XGBoost) regression algorithm for obtaining a XGBoost prediction value;

(B) providing the parameters to perform, by the first layer of the machine learning models, a Long Short-Term Memory (LSTM) algorithm for obtaining an LSTM prediction value;

(C) linking, by the machine learning models, a vector corresponding to the parameters, a vector corresponding to the XGBoost prediction value and a vector corresponding to the LSTM prediction value, to generate air pollution combination data;

(D) performing, by a second layer of the machine learning models, an XGBoost classification algorithm on the air pollution combination data to obtain an air pollution alert value for determining whether to issue an air pollution alert; and (E) performing, by the second layer of the machine learning models, the XGBoost regression algorithm on the air pollution combination data to obtain an air pollution prediction value.

2. The method of claim 1, wherein the parameters comprises PM2.5 concentration, temperature, humidity, wind speed, a wind direction, and a date.

3. The method of claim 2, wherein the date is expressed with a 2-dimensional coordinate (cos θ, sin θ), where θ=(x/365)*360°, and x indicates a date index within one year.

4. The method of claim 2, wherein the wind direction is expressed with a 2-dimensional coordinate (cos θ, sin θ), wherein θ indicates a wind direction angle.

5. The method of claim 1, wherein when the air pollution alert value is greater than a predetermined value, the air pollution alert is issued.

* * * * *